UNITED STATES PATENT OFFICE.

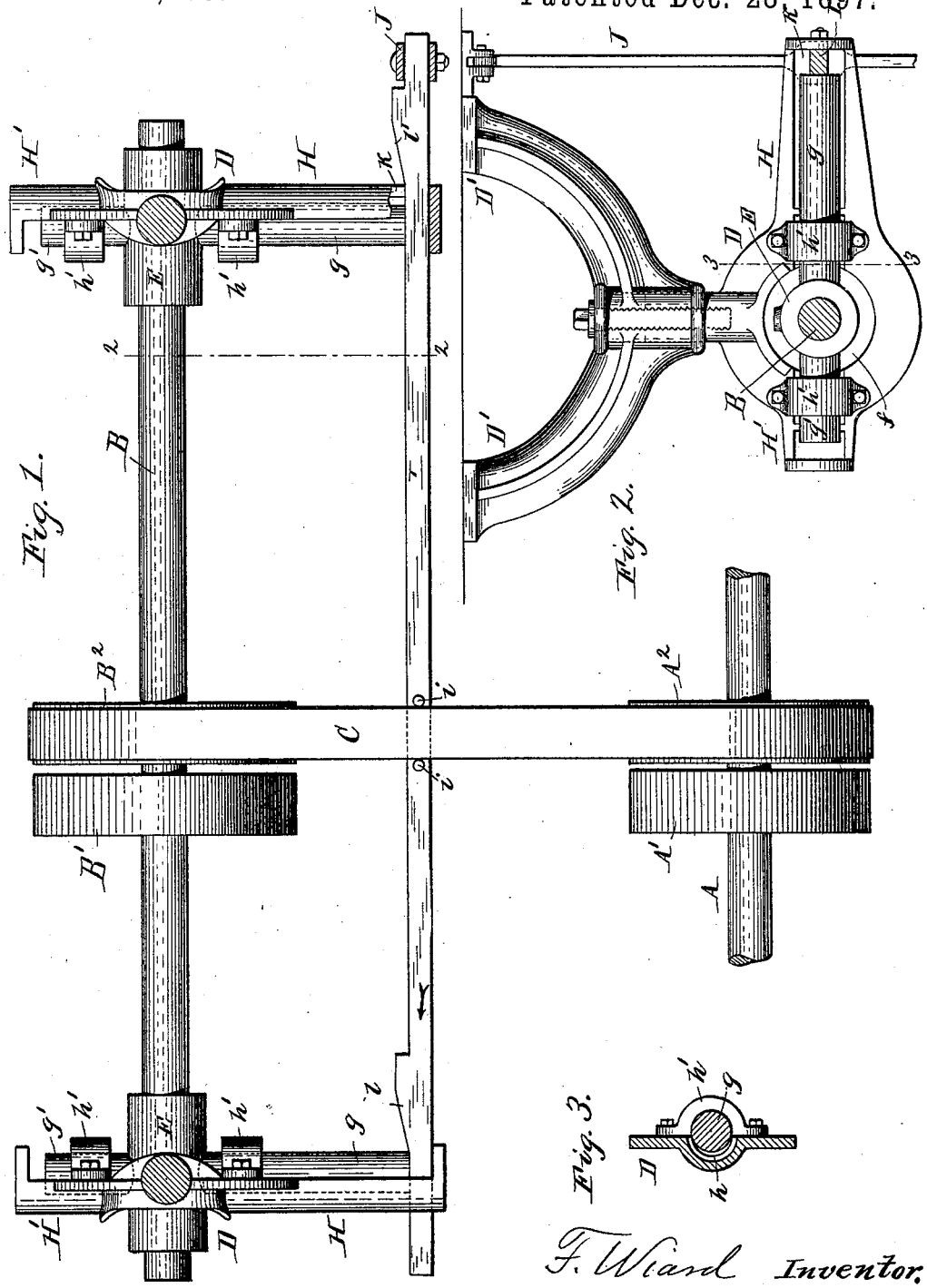

FREDERICK WIARD, OF BATAVIA, NEW YORK, ASSIGNOR OF ONE-HALF TO JOHN W. PRATT, OF SAME PLACE.

SHAFT-HANGER AND BELT-SHIFTER.

SPECIFICATION forming part of Letters Patent No. 596,256, dated December 28, 1897.

Application filed October 8, 1897. Serial No. 654,588. (No model.)

*To all whom it may concern:*

Be it known that I, FREDERICK WIARD, a citizen of the United States, residing at Batavia, in the county of Genesee and State of New York, have invented new and useful Improvements in Shaft-Hangers and Belt-Shifters, of which the following is a specification.

This invention relates to an improved shaft-hanger and belt-shifter.

When a machine driven from a main or line shaft is not in use, it is the common custom to throw the belt off the loose pulley to relieve the belt from strain; but this duty is liable to be forgotten or neglected. Belts when not in use have also been thrown out of gear and at the same time relieved from strain by shifting the counter-shaft toward the main or line shaft, so as to slacken the belt without throwing it off the pulleys; but this practice is undesirable, because the belt is not only worn by contact with the constantly-turning driving-pulley on the driving-shaft, but caused to creep or run slowly, rendering the operator liable to injury in adjusting or repairing the machine.

My invention has for its object to provide a shaft-hanger and belt-shifter whereby the belt is slackened and relieved from strain in the act of shifting the belt from the tight to the loose pulley, so as to render it impossible to stop the machine without at the same time taking the strain off the belt.

In the accompanying drawings, Figure 1 is a horizontal section of my improved shaft-hanger and belt-shifter. Fig. 2 is a vertical section in line 2 2, Fig. 1. Fig. 3 is a cross-section of one of the hangers in line 3 3, Fig. 2.

Like letters of reference refer to like parts in the several figures.

A is a main or line shaft having the tight and loose pulleys $A'$ $A^2$. B is a counter-shaft having corresponding pulleys $B'$ $B^2$, and C is the driving-belt running around said pulleys. The machine is driven from the counter-shaft by the usual belt and pulleys, which are not shown in the drawings.

D represents the overhead hangers of the counter-shaft having arms $D'$, which may be secured to the joists or ceiling in any well-known manner, and E represents the bearing-boxes of the shaft, which are carried by the hangers. These boxes are arranged in openings $f$, formed in the hanger and are capable of moving toward and from the line-shaft, so that the counter-shaft can be moved bodily with reference to the line-shaft for slackening and tightening the belt C, the openings $f$ being large enough to permit this movement of the boxes. For this purpose each bearing-box E is provided on its front and rear sides with horizontal guide-rods $g$ $g'$, which slide in concave grooves or ways $h$, formed in the inner sides of front and rear extensions H H' of the hanger. The guide-rods are confined in their grooves or ways by straps or half-bearings $h'$, secured to the inner side of the hanger.

I is a belt-shifter or shipper-bar whereby the belt C is shifted from the tight to the loose pulleys of the line and counter shafts A B, and vice versa, and which carries the usual fork $i$ for engaging the belt. The shipper-bar may be actuated by the usual depending hand-lever J or any other suitable means. This bar is arranged in front of the counter-shaft and guided in horizontal slots or openings $k$, formed in the forward extensions H of the hangers in front of the guide-rods $g$ and in line with the latter. The shipper-bar carries a pair of wedges $l$ $l'$, which are adapted to bear against the front ends of the guide-rods $g$ of the bearing-boxes when the shipper-bar is moved in the direction of the arrow in Fig. 1, so as to shift said rods and the boxes rearwardly, thereby moving the counter-shaft away from the line-shaft and tightening the belt C. Upon moving the shipper-bar in the opposite direction the wedges are withdrawn from the ends of the guide-rods $g$, allowing the weight of the belt to move the bearing-boxes and the counter-shaft toward the line-shaft and slackening the belt. By these movements of the belt-shipper the belt is at the same time shifted from the tight to the loose pulleys, and vice versa, the pulleys being so arranged that the counter-shaft is moved toward the line-shaft and the belt slackened when the belt is shifted from the tight to the loose pulleys, and so that the counter-shaft is moved away from the line-shaft and the belt tightened when the belt is shifted from the loose to the tight pulleys. The operator, in shifting the belt upon the loose pulleys for stopping the machine, is thus compelled at the same time to slacken the belt and relieve it from strain, and the performance of this act does not therefore depend on the care of the operator, who is liable to forget or neglect it.

The shifting of the belt C to the loose pulleys not only slackens that belt, but also loosens the machine-belt running from the counter-shaft down to the driving-shaft of the machine.

By the use of my improvement the belt when thrown out of gear is not merely slackened, as in the prior devices hereinbefore referred to, but it is also shifted upon the loose or idle pulleys, so that the belt receives no wear whatever and is not liable to drive the machine accidentally and injure the operator.

I claim as my invention—

1. The combination with a main and a counter shaft having tight and loose pulleys and a belt running around said pulleys, of bearing-boxes carrying the counter-shaft and capable of moving toward and from the main shaft, a belt-shifter engaging with the belt, and intermediate shifting devices whereby the bearing-boxes are moved with reference to the main shaft by the movement of the belt-shifter, substantially as set forth.

2. The combination with a main and a counter shaft having tight and loose pulleys and a belt running around said pulleys, of bearing-boxes carrying the counter-shaft and capable of moving toward and from the main shaft, and a shipper-bar engaging with the belt and having wedges which are arranged to shift said bearing-boxes away from the main shaft when the shipper-bar is moved in the proper direction to shift the belt from the loose to the tight pulleys, substantially as set forth.

3. The combination with a main and a counter shaft having tight and loose pulleys and a belt running around said pulleys, of hangers for the counter-shaft, each provided with a horizontal groove or way and in front of said way with a transverse guide, bearing-boxes carrying the counter-shaft and having guide-rods which slide in said ways, and a shipper-bar sliding in the transverse guides of the hangers and provided with wedges which are adapted to operate against the guide-rods of the bearing-boxes for shifting the latter, substantially as set forth.

4. The combination with a shaft-hanger having an opening and provided in front and in rear of said opening with extensions having guide grooves or ways, of a bearing-box arranged in the opening of the hanger and provided on its front and rear sides with guide-rods which slide in the said grooves or ways, substantially as set forth.

Witness my hand this 27th day of September, 1897.

FREDERICK WIARD.

Witnesses:
W. W. CALLEN,
C. W. BUCHHOLTZ.